Jan. 5, 1954   R. H. MOORE   2,664,966
DUST ARRESTER

Filed Jan. 15, 1949   2 Sheets-Sheet 1

Inventor
Raymond H. Moore
By Spencer, Marzall,
Johnston & Cook.
Attys

Jan. 5, 1954
R. H. MOORE
2,664,966
DUST ARRESTER
Filed Jan. 15, 1949
2 Sheets-Sheet 2
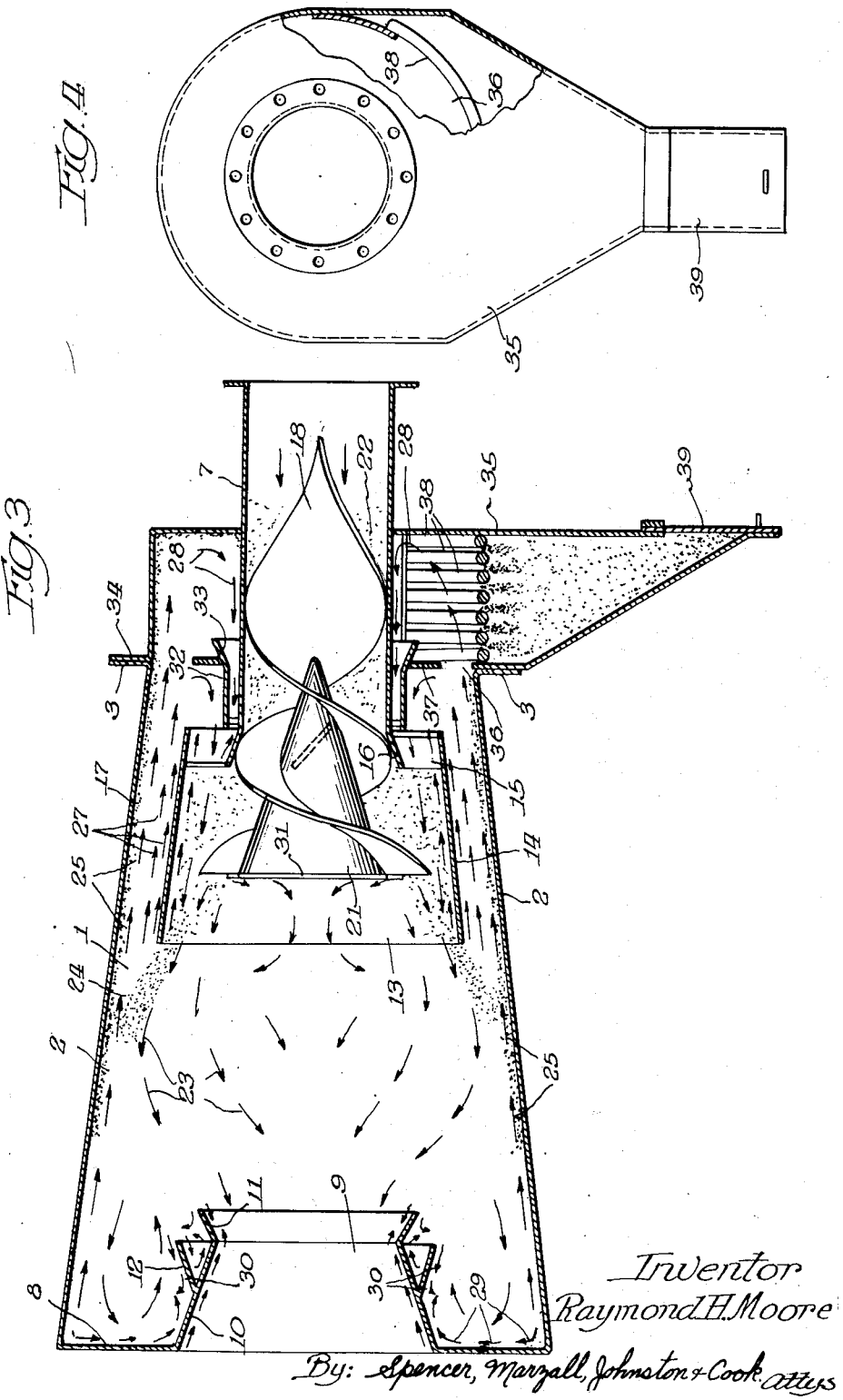

Patented Jan. 5, 1954

2,664,966

UNITED STATES PATENT OFFICE 2,664,966

DUST ARRESTER

Raymond H. Moore, Oak Park, Ill.

Application January 15, 1949, Serial No. 71,134

7 Claims. (Cl. 183—91)

This invention relates, in general, to a new and improved form of dust arrester, and is more particularly directed to a device wherein the vortex action set up therein is controlled in such a way as to retain and collect dust particles rather than spill them out with the air discharged.

Dust arresters, in general, are used in many industries such as foundries, flour mills, grain elevators, process industries, and the like where the work being carried on is of such character as to cause dust to accumulate in the atmosphere. Dust arresters are utilized to separate the dust particles from the air so as to maintain the air substantially free of any dust particles, or to reclaim the dust for reuse or further use.

Certain types of dust arresters utilize the principle of centrifugal force which is established by rapidly rotating a mass of dust-laden air, whereupon the dust particles or solid substances in the air will settle out against the walls of the container or chamber within which the air mass is rotating. Solid substances have greater densities than air, and will settle out at various velocities under the effect of gravity, depending upon their densities and particle size, except in the case of minute particles in which the effect of viscosity and surface tension exceeds that of gravity.

The rotation of the mass of air and its contained solids must be of sufficient velocity to develop centrifugal forces which are so much greater than the force of gravity to cause the separating and settling action. Centrifugal forces may be developed in this way which are more than one hundred times the force of gravity, thereby greatly accelerating the settling velocities.

It has been customary heretofore in dust arresters of this type to establish a rapidly rotating mass of air within the container or chamber by bringing the stream of dust-laden air into the chamber tangentially. This tangential stream establishes a circular motion in the entire mass of air within the chamber. This movement of air within the chamber inevitably sets up a violent vortex at the bottom thereof which is supplied by a rapid movement of air downward on the inner wall of the chamber. An upper portion of the air entering at a tangent is subject to the action of a vortex across the top plate toward the air discharge. Some of the dust or solid particles being collected would, therefore, be lost because of being trapped in this upper vortex and carried outwardly through the discharge outlet.

The phenomena of vortex action must be clearly and readily appreciated in order to fully understand the operation and advantages of the present invention. In any container where there is a rapidly rotating mass of fluid setting up centrifugal forces, a vortex will be established along any fixed surface within the chamber which extends toward the axis of the chamber. Thus, the former theory was that the vortex must be dampened in order to have an efficient operation of the arresting action.

For example, attempts have been made to dampen the main vortex action in a chamber by mounting a circular plate horizontally midway between the ends of the chamber, which plate was held in place by a plurality of bars extending inwardly from the outer wall of the chamber. It was found that this vortex not only was not dampened, but another vortex was set up on the surface of the plate, and the supporting bars acted like ducts to convey large volumes of air from the wall of the chamber to the plate to supply its vortex.

Experiments which have been conducted make it evident that viscosity causes a sluggish or non-rotating layer or stratum of air on all fixed surfaces within the chamber in which the dynamic energy of centrifugal force is reduced or even eliminated.

By the physical laws applying to fluids, pressures within a fluid are equal in all directions, therefore the pressures established by centrifugal force exist in the sluggish or dormant layer without the dynamic forces to hold them in equilibrium. For this reason the fluid in this sluggish stratum or layer is caused to move under the influence of pressure differences wherever a fixed surface extends toward the center. In a rotating mass of fluid, the pressure caused by centrifugal force will be zero at its axis and the pressure will increase as the distance away from its axis increases. The sluggish layer or stratum of fluid at any specific point is subjected to the same pressure that is established by the centrifugal force of the rotating mass of fluid in that zone, and points nearer the axis of rotation are subjected to correspondingly lower pressures. Therefore, there will be movement of fluid along fixed surfaces from the higher to the lower pressure zones.

When the fluid in this sluggish layer moves from the higher to the lower pressure zones, it is replaced by fluid from the rotating mass, which, upon contact with the fixed surfaces, becomes sluggish and supplies the vortex movement. This movement of fluid will continue throughout the full extent of the fixed surface toward the axis of rotation, at which point it will spill into a lower pressure zone of the rotating mass of fluid. Thus a vortex cycle is thereby completed.

These experiments and the analysis thereof lead to the assumption that if the entire chamber were rotated and air were passed through the chamber, there would be no vortex and any such separation of solids which would be accomplished by centrifugal force would not be disturbed by the turbulence of the vortex. Thus, all of the solids would be separated out and none would be lost by reason of a vortex action.

Experiments have also been conducted wherein a drum filled with air has been rotated, and it has proven that no vortex action takes place. The air within the rotating drum will assume the same speed of rotation as the drum because of viscosity of the air against the wall of the drum. By angular velocity, all particles of the entire rotating mass are subjected to a force outward from the center of rotation. This is the centrifugal force established. This outward force is resisted by an equal and opposite force set up by the wall of the drum or chamber which is called centripetal force. The air in the chamber being a fluid is effected only by pressure or pressure difference. Therefore, its kinetic centrifugal force tends to push the air outward against the revolving walls of the chamber in a compressive effect. The pressure caused by this centrifugal force is zero at the center of rotation and increases with the distance outward from the center to a maximum against the chamber wall. If the rotation of the chamber is continued at a constant speed, this centrifugal pressure condition within the fluid mass will become stable and the pressure will be equal in all directions at any point within the fluid mass.

If the rotation of the closed chamber is stopped, the mass of air within the chamber will continue to rotate for a period of time, and the viscosity effect against the stationary wall and its end plates will retard the rotation of the adjacent stratum of air. The film of air in immediate contact with the chamber wall and end plates will actually be stopped.

The sluggish stratum of air mass against the chamber wall and end plates will be deprived of a kinetic centrifugal energy to hold it stable and in place, but it continues to be subject to the pressure effect of that part of the air mass which continues to rotate at full speed, thereby resulting in a movement toward lower pressure zones within the sluggish stratum. The sluggish stratum of air against the end plates moves toward the center of rotation where zero centrifugal pressure obtains. It is replaced at the periphery by air from the sluggish stratum against the chamber wall which in turn is replaced from the full speed rotating mass. This in turn becomes sluggish by proximity to the stationary chamber wall. Thus a violent vortex action within the mass of air is established.

If the end plates only were to be rotated, there would be no sluggish stratum from the periphery to the center of rotation, as the air against the end plates would be in full rotation and would have the same kinetic centrifugal energy to hold it stable as possessed by the fully rotating mass of air. The sluggish stratum of air against the chamber wall would still exist, but there would be no lower pressure zone to which it could move. Therefore it would be merely compressed to react against the kinetic centrifugal energy with an equal and opposite potential energy and there would be no vortex action.

From a commercial standpoint, it would be highly impractical and extremely costly to set up a dust arrester where the chamber itself rotates. For this reason these attempts have been made to dampen the vortex action within the chamber.

The vortex phenomena may be demonstrated by a simple experiment wherein a small amount of sand is added to a glass of water. It will be noted that if the glass is rotated until the water and glass are rotating together, the centrifugal action set up will cause the sand to move outwardly and become arranged around the periphery of the bottom of the glass. From this condition, if the glass is stopped and the water is stirred to establish active rotation thereof, the sand will immediately be drawn toward the center and will be arranged in a conical pile at the center of the bottom of the glass. This indicates a strong flow of water across the bottom of the glass from the periphery to the center in true vortex form.

Having thus established a clear understanding of the vortex phenomena and the manner in which others have attempted to dampen this vortex action for the purpose of increasing the efficiency of dust arresters, it may be explained that the present invention provides an effective and efficient dust arrester so constructed as to utilize the full effect of the vortex action rather than attempt to reduce or stop such action. It is, therefore, one of the principal objects of the present invention to provide a dust arrester which is more efficient than those heretofore known.

Another object of the invention is to provide a dust arrester wherein all of the entering dust-laden fluid is subjected to a vortex action set up within the chamber that moves in a direction to separate and arrest the solids within the chamber and to expel the clarified fluid.

A further object of the invention is to provide a dust arrester wherein the chamber is formed of a frusto-conical shape, and dust-laden air is introduced into the chamber and a rapid rotation of the air causes a settling out of the dust particles. The dust-laden air is introduced and rotated in such a way that all of it is subjected to a vortex action provided by the conical walls of the chamber which carries the dust particles to an outlet, after which the vortex spill is directed back into the rapidly rotating mass of incoming air where it is again subjected to the vortex action and further particles will be settled out before the air has a chance to be discharged into the atmosphere.

Still another object of the invention is to provide a frusto-conical shaped outer chamber and a similar frusto-conical inner chamber spaced from the walls thereof and so mounted as to provide an unobstructed annular passage between the two chambers. Means are provided for introducing dust-laden air into the inner chamber and impart to said air a rapidly rotating movement, whereby the vortex spill at the bottom of the outer chamber will be caught in the rotary motion of the incoming air mass, thereby to cause a further settling of any remaining dust particles therein.

Still another object of the invention is to provide a dust arrester having an outer chamber of frusto-conical form and an inner chamber also of frusto-conical form wherein the walls of the inner and outer chambers are substantially parallel, and to further provide a means for introducing dust-laden air into the inner chamber in an axial direction, means being provided in the incoming air conduit for imparting a rapid rotation to the mass of air setting up a centrifugal force sufficient to cause a settling out of the solid particles in the air against the wall of the outer chamber.

A still further object of the invention is to provide a dust arrester wherein a varying pitch helical vane is utilized to cause a rapidly rotating movement of the incoming dust-laden air into an inner chamber disposed within and spaced from the main outer chamber thereof.

Still another and more specific object of the invention is to provide means for rapidly rotating a mass of incoming dust-laden air in a dust arrester which consists of a helical vane preferably having a gradually increasing pitch, said vane being mounted at least partially within the incoming air conduit.

Another object of the invention is to provide a dust arrester having inner and outer frusto-conical chambers with an inlet duct for dust-laden air, together with means in said duct consisting of a helical vane for imparting a rapid rotation to said air and spray means for spraying water outwardly against the walls of the chamber, whereby the dust particles are impinged against a wetted surface due to the centrifugal action set up, and will be carried downwardly along the walls of the chamber by the water to an outlet conduit.

Other objects and advantages of the invention will become apparent from a reading of the following description taken in conjunction with the accompanying drawings in which:

Fig. 3 is a vertical longitudinal sectional view through a somewhat modified form of dust arrester of the dry type; and Fig. 4 is an end elevational view of the device shown in Fig. 3 with parts thereof broken away and shown in section for the sake of clarity.

Figure 1:
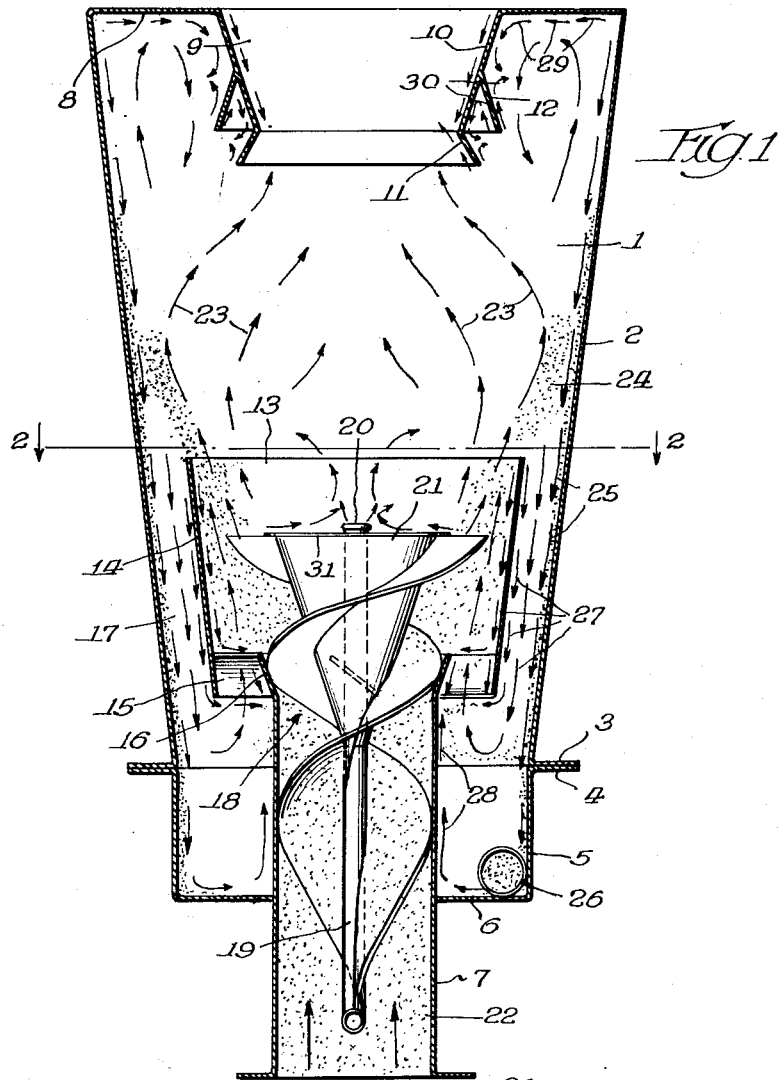
Fig. 1 is a vertical longitudinal sectional view through one form of dust arrester embodying the invention herein.
Figure 2:
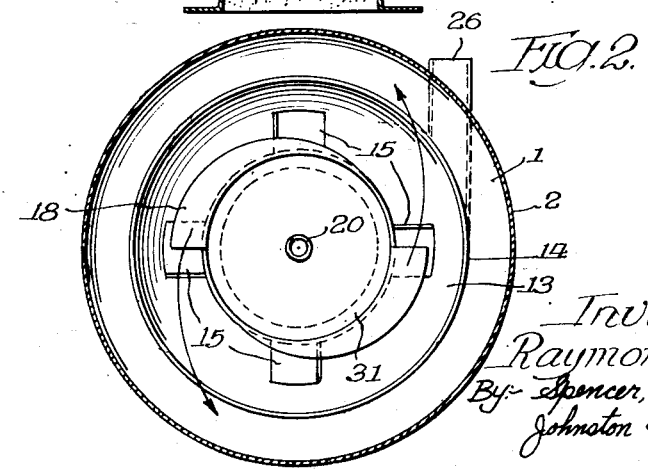
Fig. 2 is a horizontal sectional view along the plane of line 2—2 of Fig. 1.

Referring now more particularly to the drawings, the preferred form of the device embodying the invention will first be described relative to its structural details, and thereafter the operation of the device will be explained. Figs. 1 and 2 illustrate a wet type of dust arrester where the structure is positioned vertically. In this form of the invention, a main chamber 1 is enclosed by tapering side walls 2, thus forming a chamber having a generally frusto-conical shape with the larger diameter at the top and the smaller diameter at the bottom. The bottom end may be provided with an outwardly extending annular flange 3 adapted to abut against a similar flange 4 on the bottom closure member 5. The lower end of the member 5 is flanged inwardly at 6 to provide a bottom with a central opening therein to receive and support a duct 7 for the incoming dust-laden air. The duct 7 may be attached or secured to the edges of the opening in the bottom 6 by any suitable means such as by welding and the like.

The upper end of the chamber is partially covered by an annular ring or closure member 8 having a central opening 9 therein, thereby providing a clean air discharge outlet. A vortex spill trap is provided, the operation of which will be described hereinafter, and is for the purpose of recirculating some of the air at the upper part of the chamber which may still be carrying some of the lighter dust particles. This vortex spill trap includes a downwardly and inwardly inclined annular wall portion 10 secured at its upper end to the edge of the central opening in the top plate 8. This wall 10 terminates at its lower end in a downwardly and outwardly extending flange 11. Another flange or frusto-conical ring 12 is provided intermediate the ends of the wall 10 and is also positioned to extend downwardly and outwardly.

A frusto-conically shaped inner chamber 13 having the downwardly and inwardly inclined wall 14 is located coaxially with the outer chamber 1 and is spaced from the wall 2.

As stated hereinabove, it is highly desirable for the efficient operation of the device to provide a clear and unobstructed annular channel between the inner and outer chambers. For this reason a novel form of supporting means is provided for the inner chamber consisting of a plurality of radially extending supporting members 15 secured at their outer ends to the wall 14 and at their inner ends to the upper end of the duct 7 which is preferably flared outwardly and upwardly as at 16.

The annular space or channel 17 between the wall 14 of the inner chamber and the wall 2 of the outer chamber is thus completely unobstructed and permits the main vortex action to take place uninterruptedly and without turbulence at that point.

The structure thus far disclosed provides a distinct advantage over dust arresters heretofore known because each time a device was provided with an inner chamber, it has been supported by means extending between the walls of the inner and outer chambers, thereby establishing other vortex actions. This disadvantage is overcome in the present device since the channel or annular passage 17 is free of any obstructions or any supporting means which might tend to create vortices.

A further feature of the present invention resides in the novel means provided for rapidly rotating the incoming mass of dust-laden air delivered to the inner chamber. It has been the practice in the past to deliver air either to the outer or inner chambers by means of an air duct positioned tangentially with respect to the chamber, thereby to impart a swirling motion to the air within the chamber. As above explained, the greatest disadvantage which that type of construction has is that it subjects a portion of the incoming dust-laden fluid to a vortex action adjacent the clean air discharge with a coincident loss of solid particles through the clean air discharge. In the present invention the means for creating a rapid rotation of the incoming dust-laden air mass comprises a helical vane preferably having a varying pitch as generally indicated by the numeral 18. This helical vane in the form of the invention shown in Figs. 1 and 2 is mounted along the length of a conduit 19 positioned within the duct 7 and which is adapted to convey water which emerges at the upper end 20 thereof in the form of a spray. In the dry dust arrester this water conduit 19 may be dispensed with and the helical vane will appear as shown in Fig. 3.

While it is possible to operate the device with a helical vane having a constant pitch, it is, nevertheless, highly undesirable because of the sudden shock to the incoming dust-laden air due to the sudden change of direction. The rotary motion, as well as the increased speed of the incoming air, should be increased gradually and uniformly. For this reason, the helical vane is provided with a varying pitch. In Fig. 1, it will be noted that at the bottom, the vane is substantially parallel with the vertical axis of the duct 7. This angle then gradually increases to the top of the vane where it may terminate at an angle of approximately 70° with the vertical. The final angle of the vane with respect to the vertical is not critical, although it must be borne in mind that it must be great enough to impart a sufficiently rapid rotation to the dust-laden air being discharged from the duct to establish a centrifugal force many times greater than the force of gravity to insure a settling out of the dust particles against the wall of the outer chamber. Approximately halfway along the length of the vane 18, the vane supports a cone shaped member 21, the sides of which are substantially parallel to the outwardly flared flange 16 at the upper end of the duct 7. This space between the cone 21 and the flange 16 constitutes an annular channel for guiding the dust-laden air upwardly and outwardly.

The structure just described is not complicated, although the movement and behavior of the fluid and dust particles carried thereby which results from this construction is more difficult to understand. The dust-laden air 22 is supplied to the duct 7 by any suitable means (not shown). The air is usually delivered to the duct at a fairly high rate of speed and may be perhaps in the neighborhood of four thousand feet per minute. As this dust-laden air is forced upwardly through the duct 7, it becomes subject to the action of the helical vane 18 which imparts thereto a gradually increasing rotary motion. The dust-laden air emerging from the duct 7 into the inner chamber 13 and from the upper end of the helical vane 18 will have an increased velocity up to perhaps six thousand feet per minute. The velocity of the air emerging will, of course, be dependent upon its velocity when entering the duct 7, neither of these velocities being particularly critical as far as this invention is concerned. It is merely necessary that the emerging velocity and rate of rotation be sufficiently great to establish a centrifugal force which will separate out the dust particles against the wall 2 of the outer chamber.

The rapidly rotating mass of air emerging from the inner chamber 13 will impart a rapid rotation to the entire mass of air within the outer chamber and the direction of flow of this air may be illustrated somewhat diagrammatically by the group of arrows indicated at 23. The centrifugal force established will cause the dust particles indicated at 24 to settle out against the wall 2 of the outer chamber. As stated above, there is a sluggish stratum of air immediately adjacent the wall 2 which is caused to move downwardly and feeds the vortex set up by reason of the inwardly inclined position of the wall 2. The fine spray of water emerging upwardly and outwardly from the upper end of the conduit 19 impinges against the wall 2 and provides a very effective flocculating medium while passing through the dust-laden air and wets the chamber wall providing a viscous surface against which the solid particles are impinged. The spray also provides sufficient water to flush down the chamber wall. The solid particles thus separated out against the wall of the chamber will move downwardly following the path of the arrows 25 to the bottom of the chamber where a suitable outlet conduit 26 is located to carry away the water and solid particles.

Extremely minute solid particles have a large surface area in relation to their weight and their buoyancy factor is high so that they are airborne at low velocities. The centrifugal action set up by the rapidly rotating mass of air is effective in separating very small solid particles out of the air stream, but they are readily picked up by moderate turbulence unless flocked with other particles or retained by adhesion. The water spray provides this flocculating medium, but there will still remain in the air a small amount of the minute dust particles which may be carried through the discharge outlet of the chamber unless they are subjected to further separating action by recirculation.

As heretofore explained, any fixed surface which extends from a larger to a smaller diameter within the chamber acts as a duct to set up a vortex action. Thus, the tapering side walls 14 of the inner chamber will establish a secondary vortex which may be conveniently indicated by the group of arrows on either side of the wall 14 and represented by the numeral 27. The main vortex which is fed by the downwardly moving air indicated by the arrows 25 has an upward movement along the wall of the duct 7 as shown by the arrows 28. This upward movement of air of the main vortex passes upwardly into the bottom of the inner chamber where it is caught in the swirling mass of air therein and emerging from the duct 7, whereupon it is thus recirculated and is again subjected to the centrifugal action of the rapidly rotating air mass, whereupon a further settling out of the lighter dust particles is accomplished. The same action occurs to the air of the secondary vortex fed by the downwardly moving air stream at 27. This air stream moves inwardly and upwardly and is also caught by the rotating mass of air emerging from the duct 7 whereupon it is again subjected to the separating action of centrifugal force. The inner chamber also has the effect of protecting the vortex movement downwardly along the wall 2 of the outer chamber from the scouring turbulence of the high velocity air emerging from the duct 7.

The flat top plate 8 at the upper end of the chamber also causes a vortex action of limited extent since only that portion of the peripheral sluggish stratum of air adjacent the top plate can feed this vortex. The vortex trap previously described is so constructed as to establish a counter-vortex movement which meets the vortex caused by the top plate at the point of smallest diameter where the two opposing vortices are caused to spill into the mass of rotating air within the chamber and away from the point of air discharge. The small group of arrows 29 indicate the vortex movement across the top plate. The arrows 30 illustrate the counter-vortex movement upwardly along the frusto-conical surface 12. These two movements will meet at the point of smallest diameter, thereby causing the air to spill outwardly into the rapidly rotating air mass within the chamber. The smaller arrows in the area between the flanges 11 and 12 illustrate the vortex and counter-vortex movement at that point. The air moves upwardly along the inner surface of flange 12 and thence downwardly along the outer surface of the wall 10 where it is met by air moving upwardly along the outer surface of flange 11, thus spilling the air outwardly into the rapidly rotating air mass within the chamber.

It will thus be evident that all of the dust-laden air is subjected to a plurality of separating actions. The heavier solid particles are separated out in the main action and by the main vortex. The various vortices established are controlled in such a way as to utilize the action of the vortex to re-energize and recirculate the air containing any smaller dust particles not separated out in the first action, so that they may thereafter be flocked and separated out in a subsequent action. The minute dust particles at the top of the chamber which are not separated by the main vortex action are prevented from spilling into the discharge opening by means of the spill trap and are thus subjected to further separating action in the rapidly rotating air mass. It will thus be evident that the various vortices inevitably established in a dust arrester are controlled and utilized advantageously to cause subsequent separating actions thus increasing tremendously the efficiency of the device. No attempt is made to dampen or stop completely any vortex action as has been done heretofore.

It will be noted that the plate 31 covering the upper end of the cone 21 is a fixed surface and therefore establishes a small vortex to carry the air inwardly from the higher to the lower pressure zones. Even the air in this vortex action is caught in the rapidly rotating air mass and subjected to further separating action.

Referring now more particularly to Figs. 3 and 4, this form of the invention illustrates a dry dust arrester which operates in the same manner as the device shown in Fig. 1, except that it may be positioned horizontally, as shown, and the device for actually collecting the solid particles is slightly different. The frusto-conical outer chamber is identical in all respects to that shown in Fig. 1. The inner chamber 13 bounded by the tapering wall 14 as well as the inlet duct 7 and helical vane 18 are also identical, except that the water conduit 19 has been omitted.

The additional structure for this type of dust arrester includes an annular cylindrical member 32 surrounding the inner end of the duct 7 having an outwardly flared flange portion 33 at its outer end. The annular flange 3 abuts against a suitable surface 34 of a collector chamber 35 and is secured thereto. The chamber 35 surrounds the inlet duct 7 and has an annular opening 36 in its inner wall 37 communicating with the interior of the chamber 1. This opening 36 follows the contour of the wall 2 of the outer chamber so that solid particles which have been separated out will be carried by the vortex action through the opening 36 and into the collector chamber 35. A plurality of spaced grille members 38 provide an inner space for dust separation whereupon the dust particles will pass downwardly by gravity between the grille members 38 and may be collected within the chamber and eventually removed through an opening at the bottom thereof normally closed by a gate 39.

As in the first embodiment of the invention, the dust-laden air enters the duct 7 whereupon the helical vane 18 imparts a rapidly rotating movement to this air as it emerges from the inner end of the duct. The same vortices will be established as above described, and these vortices are controlled in the same manner and by the same construction to separate out the solid particles and thereafter re-energize the air in which the smaller and lighter dust particles might remain. The separated particles will move with the sluggish stratum of air against the wall 2 of the outer chamber from the larger to the smaller end thereof. The main vortex is used to convey the separated particles along the wall of the outer chamber and deposit them through the opening 36 into the collector 35.

In both forms of the invention the incoming dust-laden air is caused to rapidly rotate as it emerges into the chamber by the varying pitch helical vane. The inner chamber is so mounted as to provide a clear and unobstructed annular passage for the main vortex and the construction is such as to subject the air to a plurality of separating actions before being discharged through the discharge outlet. The spill trap at the large end of the outer chamber also causes a recirculation of the air and aids in preventing air being discharged which still contains any great amount of even the minute and extremely buoyant dust particles.

Changes may be made in the form, construction and arrangement of parts from that disclosed herein without in any way departing from the spirit of the invention or sacrificing any of the attendant advantages thereof, provided, however, that such changes fall within the scope of the claims appended hereto.

The invention is hereby claimed as follows:

1. A dust arrester comprising an inlet duct for the passage of dust-laden air, a circular inlet chamber open at both ends thereof and having a larger diameter at its upper end than at its lower end, means for violently rotating the mass of dust-laden air within the inlet chamber and ejecting the entire rotating mass from the larger upper end of the said inlet chamber, a circular dust arresting chamber extending above and surrounding said inlet chamber in spaced relation thereto and having the upper end thereof of larger diameter than the lower end, the space between said inlet chamber and said dust arresting chamber providing an annular passage around the inlet chamber from the top to the bottom thereof, an air discharge opening centrally disposed in the upper end of said dust arresting chamber, said dust arresting chamber being in full communication with the larger open upper end of said inlet chamber to receive the entire volume of the rotating dust-laden air as it is expelled from the open upper end of said inlet chamber, the said dust arresting chamber also being in full communication with the said annular passage, the aforesaid form of said dust arresting chamber being adapted to promote a liberal vortex action of air flow downwardly along the surface of its walls from the larger to the smaller end thereof and through said annular passage, said discharge opening being spaced upwardly from the upper open end of said inlet chamber a sufficient distance to permit particulate matter entering with the rotating mass of air from the inlet chamber to settle outwardly by centrifugal force into the path of the downwardly moving vortex flow of air, thereby allowing the dust-free air to be expelled through the discharge opening, a dust collecting chamber below said inlet chamber in spaced relation thereto, said dust collecting chamber being in full communication both with said annular passage and with the smaller open lower end of said inlet chamber, means in said dust collecting chamber for separating and discharging particulate matter from the air of the vortex passing therethrough, said dust collecting chamber being adapted to conduct the air of the vortex into the bottom of said inlet chamber, whereby said air from the vortex will join the incoming dust-laden air to be re-energized to violent rotation within the inlet chamber and be again subjected to the complete dust arresting cycle.

2. A dust arrester comprising an inlet duct for the passage of dust-laden air, means for violently rotating the mass of dust-laden air and ejecting it from one end of said duct, a circular inlet chamber open at both ends thereof having a larger diameter at its upper end than at its lower end, said inlet duct being adapted to eject the mass of rotating air into said inlet chamber through the smaller lower end thereof, a circular dust arresting chamber having a larger diameter at its upper end than at its lower end and positioned above and around said inlet chamber in spaced relation thereto thereby providing an annular passage around said inlet chamber extending from the top to the bottom thereof, an air discharge opening centrally disposed in the upper end of said dust arresting chamber, said dust arresting chamber being in full communication both with the larger open upper end of said inlet chamber and the upper end of said annular passage to receive the entire volume of the rotating mass of dust-laden air at its smaller diameter lower end as the rotating mass of dust-laden air is expelled from the open upper end of said inlet chamber, the aforesaid form of the dust arresting chamber being adapted to promote a liberal vortex action of air flow downwardly along the surface of its walls from the larger to the smaller end thereof and through said annular passage, said discharge opening being spaced upwardly from the upper end of said inlet chamber a sufficient distance to permit the particulate matter entering with the rotating mass of air from the inlet chamber to settle outwardly by centrifugal force into the downwardly moving path of vortex flow, thereby allowing the dust-free air to be expelled through the discharge opening, a dust collecting chamber below said inlet chamber in spaced relation thereto, there being an annular passage around said inlet duct and within the smaller open lower end of said inlet chamber, the said dust collecting chamber being in communication both with said first named annular passage and with the open lower end of said inlet chamber, and means in said dust collecting chamber for separating and discharging particulate matter from the air of the vortex passing therethrough, said last named annular passage being adapted to conduct the air of the vortex from said dust collecting chamber into the bottom of said inlet chamber, whereby said air from the vortex will join the incoming dust-laden air to be re-energized to violent rotation within the inlet chamber and be again subjected to the complete dust arresting cycle.

3. A dust arrester comprising a chamber of frusto-conical form having an air discharge opening at the end of larger diameter, a second chamber disposed within and spaced from the wall of said first chamber thereby forming an annular duct having an outer diameter which is greater at the end thereof toward said discharge opening than at the other end thereof, and having said end of greater outer diameter spaced axially inwardly from said discharge opening, an inlet conduit for dust-laden air at the opposite end of said first chamber extending axially thereof and terminating within said second chamber, said inlet conduit being spaced radially inwardly from the wall of said second chamber, thereby permitting the passage of air through said second chamber from said first chamber, and means for rapidly rotating the mass of dust-laden air emerging from said conduit, whereby the centrifugal pressures exerted by the rotating air within both chambers will cause a liberal flow of dust-laden air through said annular duct in a direction away from said discharge opening.

4. A dust arrester comprising a chamber of frusto-conical form having an air discharge passage at the end of larger diameter, a second chamber disposed within and spaced from the wall of said first chamber, thereby providing an annular passage between the two chambers, the inner end of said second chamber terminating short of the inner end of said discharge passage, whereby some of the dust-laden air passing through said second chamber will spill over into said annular passage, means for discharging dust-laden air directly into said second chamber, there being an annular space between said last named means and said second chamber, and means for rapidly rotating the mass of dust-laden air discharged into said second chamber, whereby the centrifugal pressures exerted by the rotating air within both chambers will cause a liberal vortex action of the dust-laden air in a generally axial direction away from the discharge passage.

5. A dust arrester comprising a chamber of frusto-conical form having an air discharge passage at the end of larger diameter, a second chamber also of frusto-conical form disposed within and spaced from the wall of said first chamber, the walls of said chambers being substantially parallel, whereby an annular passage is provided between the two chambers, the inner end of said second chamber terminating short of the inner end of said discharge passage, whereby some of the dust-laden air passing through said second chamber will spill over into said annular passage, means for discharging dust-laden air directly into said second chamber, there being an annular space between said last named means and said second chamber, and means for rapidly rotating the mass of dust-laden air discharged into said second chamber, whereby the centrifugal pressures exerted by the rotating air within both chambers will cause a liberal vortex action of the dust-laden air in a generally axial direction away from the discharge passage.

6. A dust arrester comprising a chamber of frusto-conical form having an air discharge passage at the end of larger diameter, a second chamber disposed within and spaced from the wall of said first chamber, means for introducing dust-laden air into said second chamber, means for supporting said second chamber on said last named means, whereby to provide a completely unobstructed annular passage between the two chambers, the inner end of said second chamber terminating short of the inner end of said discharge passage, whereby some of the dust-laden air passing through said second chamber will spill over into said annular passage, said supporting means including a plurality of circumferentially spaced members, thereby providing a substantially unobstructed annular space between said first mentioned means and said second chamber, and means for rapidly rotating the mass of dust-laden air introduced into said second chamber, whereby the centrifugal pressures exerted by the rotating air within both chambers will cause a liberal vortex action of the dust-laden air in a generally axial direction away from the discharge passage.

7. A dust arrester comprising a chamber of frusto-conical form having an air discharge passage at the end of larger diameter, a second chamber disposed within and spaced from the wall of said first chamber, thereby providing an annular passage between the two chambers, the inner end of said second chamber terminating short of the inner end of said discharge passage, whereby some of the dust-laden air passing through said second chamber will spill over into said annular passage, an axially disposed inlet duct at the opposite end of said first chamber terminating within said second chamber but short of the inner end of the second chamber and spaced from the wall thereof to provide an annular space therebetween, said duct adapted to discharge dust-laden air into said second chamber, and means for rapidly rotating the mass of dust-laden air discharged into said second chamber, whereby the centrifugal pressures exerted by the rotating air in both chambers will cause a liberal vortex action of the dust-laden air in a generally axial direction away from the discharge passage.

RAYMOND H. MOORE.

References Cited in the file of this patent

UNITED STATES PATENTS

| Number | Name | Date |
| --- | --- | --- |
| 1,214,249 | Williams | Jan. 30, 1917 |
| 1,215,935 | Hickman | Feb. 13, 1917 |
| 1,509,910 | Stebbins | Sept. 30, 1924 |
| 1,715,549 | Hawley | June 4, 1929 |
| 1,724,041 | Plaisted | Aug. 13, 1929 |
| 1,933,730 | Gredell | Nov. 7, 1933 |
| 1,970,077 | Collins | Aug. 14, 1934 |
| 2,331,786 | Lincoln | Oct. 12, 1943 |
| 2,496,281 | Fisher | Feb. 7, 1950 |

FOREIGN PATENTS

| Number | Country | Date |
| --- | --- | --- |
| 77,747 | Germany | Oct. 30, 1894 |
| 104,358 | Australia | June 23, 1938 |
| 300,841 | Great Britain | Nov. 22, 1928 |